（12） United States Patent
Bozkaya et al.

(10) Patent No.: US 7,979,384 B2
(45) Date of Patent: Jul. 12, 2011

(54) ANALYTIC ENHANCEMENTS TO MODEL CLAUSE IN STRUCTURED QUERY LANGUAGE (SQL)

(75) Inventors: Tolga Bozkaya, Belmont, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 399 days.

(21) Appl. No.: 12/113,889

(22) Filed: May 1, 2008

(65) Prior Publication Data

US 2008/0208822 A1    Aug. 28, 2008

Related U.S. Application Data

(63) Continuation-in-part of application No. 11/243,335, filed on Oct. 3, 2005, now abandoned, which is a continuation-in-part of application No. 10/703,412, filed on Nov. 6, 2003, now Pat. No. 7,761,400.

(51) Int. Cl.
*G06F 17/30* (2006.01)
(52) U.S. Cl. .......................................... 707/602; 707/769
(58) Field of Classification Search .................. 707/713, 707/774, 602, 603
See application file for complete search history.

(56) References Cited

U.S. PATENT DOCUMENTS

| 5,319,777 A | 6/1994 | Perez |
| 5,359,724 A | 10/1994 | Earle |
| 5,485,608 A | 1/1996 | Lomet et al. |
| 5,819,282 A | 10/1998 | Hooper et al. |
| 5,870,760 A | 2/1999 | Demers et al. |
| 5,943,668 A | 8/1999 | Malloy et al. |
| 5,978,796 A | 11/1999 | Malloy et al. |
| 6,298,342 B1 | 10/2001 | Graefe et al. |
| 6,317,750 B1 | 11/2001 | Tortolani et al. |
| 6,389,410 B1 | 5/2002 | Gupta |
| 6,434,544 B1 | 8/2002 | Bakalash et al. |
| 6,615,241 B1 | 9/2003 | Miller et al. |

(Continued)

FOREIGN PATENT DOCUMENTS

JP    411161656 A    9/1999

(Continued)

OTHER PUBLICATIONS

Gray Jim et al., "Data Cube: A Relational Aggregation Operator Generalizing Group-By, Cross-Tab, and Sub-Totals," Feb. 26, 1996, IEEE, XP010158909, pp. 152-159.

(Continued)

*Primary Examiner* — Shahid A Alam
*Assistant Examiner* — James E Richardson
(74) *Attorney, Agent, or Firm* — Hickman Palermo Truong & Becker LLP

(57) ABSTRACT

A method for processing queries is provided. A database server receives and executes a query to generate a relation. The query comprises first one or more clauses and a model clause. The model clause comprises a rule that has a left-side expression and a right-side expression. In one embodiment, the right-side expression of the rule includes a window function, which specifies one or more partition columns. In an embodiment, the left-side expression comprises a for-loop predicate. The for-loop predicate is unfolded after the database server compiles the query. In one embodiment, the left-side expression of the rule comprises one or more existential predicates, where each existential predicate evaluates to a Boolean value.

32 Claims, 3 Drawing Sheets

U.S. PATENT DOCUMENTS

| | | | |
|---|---|---|---|
| 6,622,138 | B1 | 9/2003 | Bellamkonda et al. |
| 6,631,371 | B1 | 10/2003 | Lei et al. |
| 6,985,895 | B2 | 1/2006 | Witkowski et al. |
| 7,177,855 | B2 | 2/2007 | Witkowski et al. |
| 7,761,403 | B2 | 7/2010 | Witkowski et al. |
| 2002/0059203 | A1* | 5/2002 | Witkowski et al. ............... 707/3 |
| 2002/0107754 | A1 | 8/2002 | Stone |
| 2004/0133567 | A1 | 7/2004 | Witkowski et al. |
| 2004/0133568 | A1 | 7/2004 | Witkowski et al. |
| 2007/0078826 | A1 | 4/2007 | Bozkaya et al. |
| 2007/0192336 | A1 | 8/2007 | Iyer et al. |

FOREIGN PATENT DOCUMENTS

| | | |
|---|---|---|
| WO | WO 99/48029 A1 | 9/1999 |

OTHER PUBLICATIONS

Rittman, Mark, "The New Oracle 10g SQL Model Clause," Breaking Oracle News, http://dba-oracle.com/oracle_news/2004_1_15_rittman.htm, data retrieved Apr. 8, 2004, pp. 1-4.

Mohan, C. et al., "ARIES-RRH: Restricted Repeating of History in the ARIES Transaction Recovery Method," Proceeding of the Seventh International Conference on Data Engineering, Apr. 18-20, 1991, IEEE 1991, pp. 718-727.

Lane, Paul, "Oracle Database Data Warehouses Guide", 10g Release 1(10.1), Oracle Corporation, Dec. 2003, 81 pages.

Haydu, John, "The SQL Model Clause of Oracle Database 10g", Oracle Corporation, Aug. 2003, 20 pages.

J.M. Hellerstein and M. Stonebraker, "Predicate migration: Optimizing queries with expensive predicates," Proceedings of ACM SIGMOD 2003, Washington DC, 1993.

Andrew Witkowski, et al., "Advanced SQL Modeling in RDBMS", Oracle Corporation, ACM Transactions on Database Systems, vol. 30, No. 1, Mar. 2005, pp. 83-121.

U.S. Appl. No. 10/703,412, filed Nov. 6, 2003, Notice of Allowance, Mar. 11, 2010.

* cited by examiner

Fig. 1

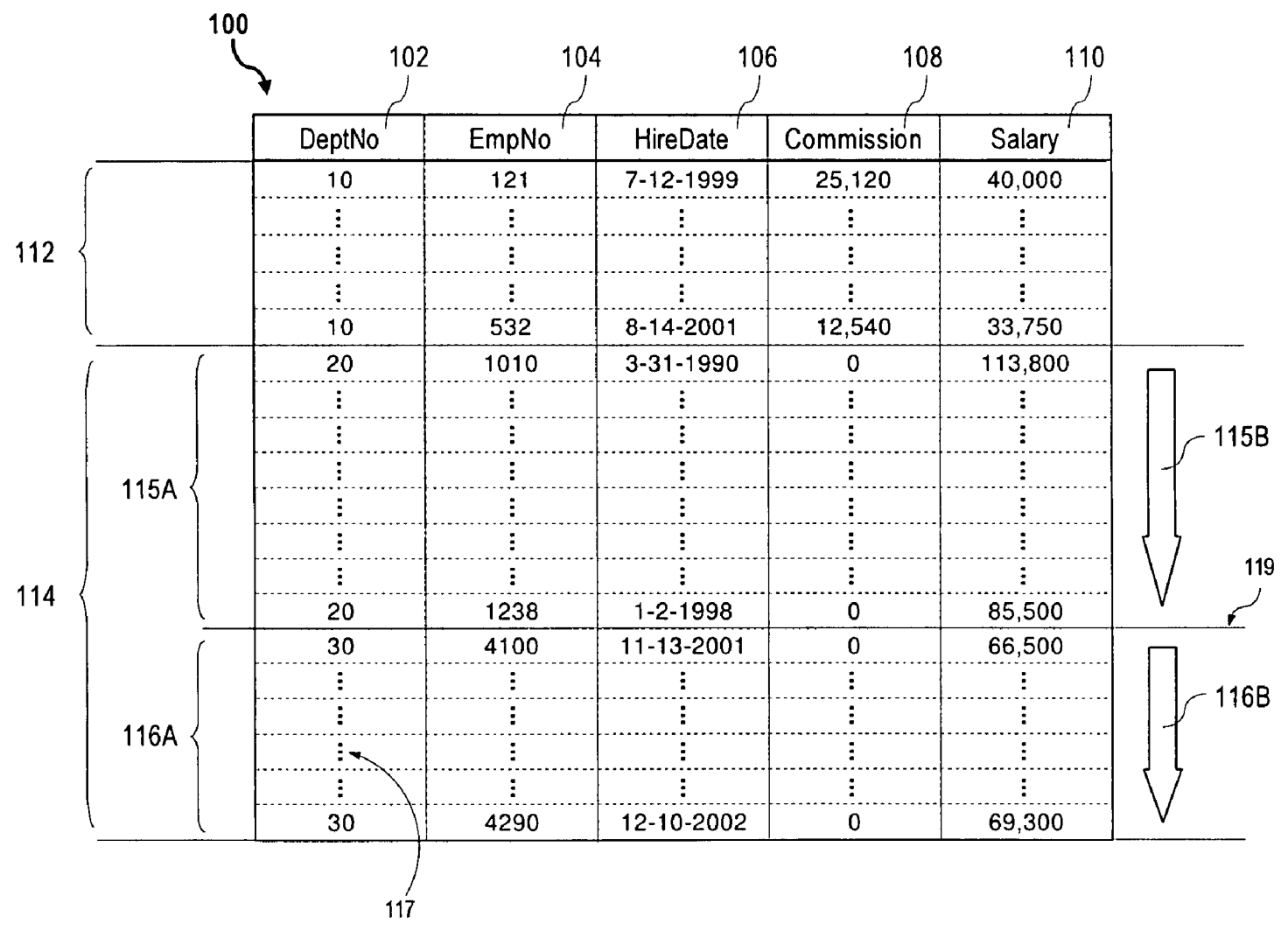

| DeptNo | EmpNo | HireDate | Commission | Salary |
|---|---|---|---|---|
| 10 | 121 | 7-12-1999 | 25,120 | 40,000 |
| ... | ... | ... | ... | ... |
| 10 | 532 | 8-14-2001 | 12,540 | 33,750 |
| 20 | 1010 | 3-31-1990 | 0 | 113,800 |
| ... | ... | ... | ... | ... |
| 20 | 1238 | 1-2-1998 | 0 | 85,500 |
| 30 | 4100 | 11-13-2001 | 0 | 66,500 |
| ... | ... | ... | ... | ... |
| 30 | 4290 | 12-10-2002 | 0 | 69,300 |

ANALYTIC ENHANCEMENTS TO MODEL CLAUSE IN STRUCTURED QUERY LANGUAGE (SQL)

PRIORITY CLAIM; CROSS-REFERENCE TO RELATED APPLICATIONS

This application claims benefit and priority under 35 U.S.C. §120 as a Continuation-In-Part of U.S. patent application Ser. No. 11/243,335, entitled "ANALYTIC ENHANCEMENTS TO MODEL CLAUSE IN STRUCTURED QUERY LANGUAGE (SQL)" and filed by Tolga Bozkaya et al. on Oct. 3, 2005, now abandoned the entire contents of which is hereby incorporated by reference for all purposes as if fully set forth herein; this application also claims benefit and priority under 35 U.S.C. §120 as a Continuation-In-Part of U.S. patent application Ser. No. 10/703,412, entitled "RUN-TIME OPTIMIZATIONS OF QUERIES WITH SQL SPREADSHEET" and filed by Andrew Witkowski et al. on Nov. 6, 2003, now U.S. Pat. No. 7,761,400 the entire contents of which is hereby incorporated by reference for all purposes as if fully set forth herein.

This application is related to U.S. patent application Ser. No. 09/886,839, entitled "PERFORMING SPREADSHEET-LIKE CALCULATIONS IN A DATABASE SYSTEM", filed by Andrew Witkowski et al. on Jun. 20, 2001, the entire contents of which are herein incorporated by reference for all purposes as if originally set forth herein.

This application is related to U.S. patent application Ser. No. 10/704,192, entitled "COMPILE-TIME OPTIMIZATIONS OF QUERIES WITH SQL SPREADSHEET", filed by Andrew Witkowski et al. on Nov. 6, 2003, the entire contents of which are herein incorporated by reference for all purposes as if originally set forth herein.

FIELD OF THE INVENTION

The present invention relates to processing queries. The invention relates more specifically to analytic enhancements for processing model clauses in Structured Query Language (SQL) queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One of the most successful analytical tools is a spreadsheet. A user can enter business data, define formulas over it using two-dimensional array abstractions, construct simultaneous equations with recursive models, pivot data, compute aggregates for selected cells, and apply a rich set of business functions. Some spreadsheets also provide a flexible user interface with various graphical elements, such as graphs, reports, and charts.

Unfortunately, the analytical usefulness of conventional Database Management Systems (DBMS) has not measured up to that of spreadsheets or specialized MOLAP (Multidimensional OnLine Analytical Processing) tools. Traditionally, the analytical capabilities of a DBMS have been cumbersome and in most cases inefficient to perform array-like calculations in SQL—a fundamental problem resulting from a lack of language constructs to treat relations as arrays and to define formulas over them and a lack of efficient random access methods for inter-row calculations.

To address the gaps in the analytical capabilities of conventional DBMS, SQL has recently been extended to include language constructs, referred to herein as "spreadsheet extensions", that allow relations to be treated as n-dimensional arrays and that allow formulas to be defined in terms of the elements of the arrays. The formulas, which are referred to hereinafter as "rules", are encapsulated in a new SQL clause. This new SQL clause is referred to hereinafter as a "model" clause. A SQL model clause included in a query supports partitioning of the data in the relation that is generated as a result of executing the query. (The term "query" as used herein refers to a statement that conforms to a query language, such as SQL, and specifies operations to manipulate data.)

The spreadsheet extensions of a query language supported by a DBMS provide for defining and executing spreadsheet-like operations on data managed by the DBMS. The spreadsheet extensions provide an improvement over traditional spreadsheet programs by integrating their analytical functions into a DBMS, thus improving readability with symbolic referencing and providing greater scalability and improved manageability of data, security, storage space, and other parameters that are managed by the DBMS. Additionally, the spreadsheet extensions provide a clear improvement over conventional database query languages by providing spreadsheet-like computations directly within the language.

SQL Model Clause

The model clause enables the creation of a multi-dimensional array by mapping the columns of a relation, which may be generated by executing a query that includes the model clause, into three groups: partition, dimension, and measure columns. The partition, dimension, and measure columns provide the following functionalities:

Partition columns define the partitions in a relation as logical blocks in the result set of rows that is returned by the underlying query. The rule or rules specified in the model clause are applied to each partition independent of other partitions.

Dimension columns define the multi-dimensional array and are used as an array index to identify cells within a partition. Each cell may be accessed by specifying its full combination of dimensions. The dimension columns included in the relation may be considered analogous to the keys of a relational table.

Measure columns represent data stored in a relation. The data in the measure columns of a relation may be computed from data retrieved by the underlying query. The measure columns typically contain numeric values such as sales units or cost.

The model clause also provides for specifying rules to manipulate the measure values of the cells in the multi-dimensional array defined by partition and dimension columns. The rules access and update measure column values by specifying dimension values directly or symbolically. Model clause rules may also use wild cards and looping constructs as references to dimension columns, thus allowing higher readability and maximum expressiveness.

A model clause may comprise one or more rules. Each rule represents an assignment of values to cells in a multi-dimensional array mapped from a relation. A rule comprises a left-side expression and a right-side expression. The left-side expression of a rule identifies a set of cells to which values are assigned. The right-side expression specifies how to compute the values that are assigned to the set of cells referenced by the left-side expression of the rule. (As used herein, the terms "left-side" and "right-side" do not necessarily indicate a "left" and "right" positional locations. Instead, the term "left-side expression" refers more broadly to an expression in an assignment operator that identifies one or more cells to which values are assigned, and the term "right-side expression" refers more broadly to an expression in the assignment operator that specifies how to compute the values that are being assigned.) Evaluating a rule means that, for each cell referenced by the left-side expression of the rule, the right-side expression of the rule is computed and the computed value is assigned to the corresponding cell.

An example of a query ("Q1"), that includes a model clause is provided below:

```
Q1.  SELECT  region, product, year, sales
     FROM    sales_table
     WHERE   region in ('South Bay', 'East Bay')
     MODEL   RETURN UPDATED ROWS
             PARTITION BY (region)
             DIMENSION BY (product, year)
             MEASURES (sales)
     RULES
         ( sales['Ball', 2001] =   5100,
           sales['Ball', 2002] =   sales['Ball', 2001] +
                                   sales['Ball', 2000],
           sales['Bike', 2002] =   2 * sales['Bike', 2001]
         )
```

The above query is executed against the source table "sales_table", which comprises the columns "region", "product", "year", and "sales". This query, when executed, returns a relation based on rows from the "sales_table" for the South Bay and East Bay regions. The model clause in the query specifies that the data in the relation is partitioned on the "region" column. The model clause also defines, within each partition, a two-dimensional array on columns "product" and "year". Each row in this array holds a measure value in the "sales" column. The first rule specified in the model clause sets to "5,100" the sales of a product called "Ball" in the year 2001. The second rule specified in the model clause defines that the sales value of the "Ball" product in the year 2002 are equal to the sum of the sales values of the "Ball" product in the years 2001 and 2000. The third rule specified in the model clause defines that the sales value of a product called "Bike" in the year 2002 is twice the sales value of the same product in the previous year 2001.

The relation resulting from the execution of query Q1 is listed in Table 1 below. Based on the "RETURN UPDATED ROWS" option specified in the model clause, the query returns only those rows that are updated or inserted in the resulting relation by the model clause.

TABLE 1

Relation returned by query Q1

| REGION (partition) | PRODUCT (dimension) | YEAR (dimension) | SALES (measure) |
|---|---|---|---|
| South Bay | Ball | 2001 | 5,100 |
| South Bay | Ball | 2002 | 8,525 |
| South Bay | Bike | 2002 | 718 |
| East Bay | Ball | 2001 | 5,100 |
| East Bay | Ball | 2002 | 8,310 |
| East Bay | Bike | 2002 | 912 |

The existing DBMS implementations for processing queries with model clauses, however, have some significant disadvantages. One such disadvantage is related to evaluating window functions that are present in the right-side expression of a rule that is included in the model clause of a query. As referred to herein, a "window function" is any function that includes an OVER clause. Examples of window functions include, but are not limited to, SQL windowing functions with OVER clauses that are used to compute cumulative, moving, and centered aggregates over ranges of values and/or rows, some ranking and distribution functions, and lag/lead functions. Typically, a DBMS will raise a syntax error if a window function is present in the right-side expression of a rule, and the reason for this is that processing of window functions included in the right-side expression of a rule is not supported by the DBMS.

Another disadvantage is related to the processing of for-loop predicates included in the left-side expression of a rule that is included in the model clause of a query. Typically, a rule with a for-loop predicate in its left-side expression is unfolded into multiple rules at compile-time. Unfolding of such a rule at compile-time requires each iteration of the for-loop predicate to produce constant values, which are then used to construct the multiple rules. This requirement, however, disallows the use in the for-loop predicate of expressions that can be evaluated only at run-time, which significantly limits the usefulness of for-loop predicates.

Another disadvantage is related to the use of existential predicates in the left-side expression of an UPSERT rule that is included in the model clause of a query. An existential predicate specified in the left-side expression of a rule evaluates to a Boolean TRUE or FALSE value when applied to a dimension value. This means that an existential predicate in the left-side expression of a rule may reference no cells, or more than one cell in the relation over which the rule is being evaluated. Thus, an existential predicate in the left-side expression of a rule may prevent the insertion, in the resulting relation, of any newly created row or rows across that may be created as a result of executing an UPSERT operation.

Based on the foregoing, in order to overcome the disadvantages described above it is desirable to provide analytic enhancements to the SQL model clause along with techniques for processing queries that include such enhanced model clauses.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates partitioning of a set of rows into partitions and evaluating a window function over each partition according to an embodiment;

DETAILED DESCRIPTION

Figure 2:
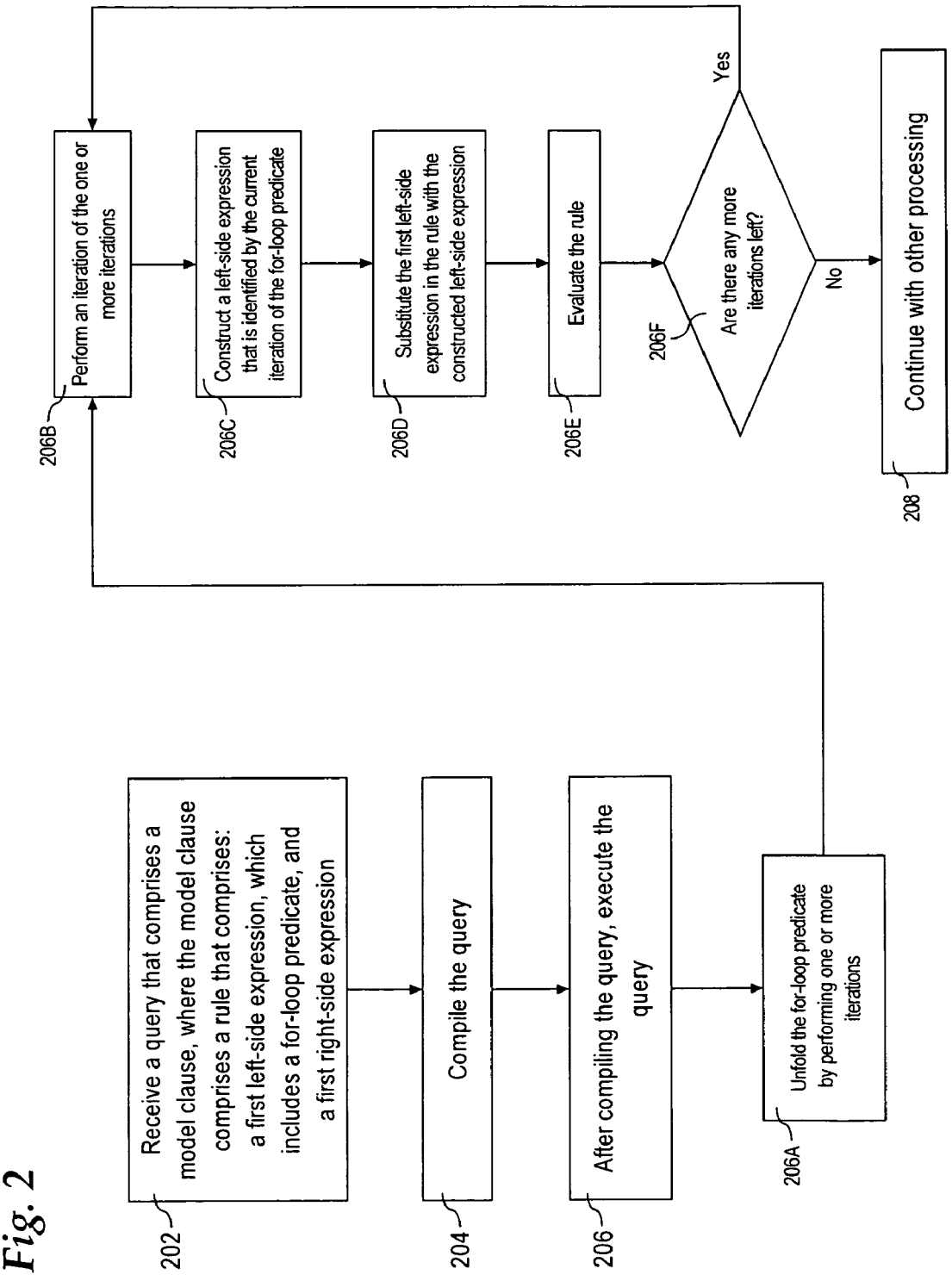
FIG. 2 is a flow diagram that illustrates a high level overview of one embodiment of a method for processing queries.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

I. Functional Overview

Techniques are described for processing queries in computer systems. In one aspect, a database server receives and executes a query to generate a relation. The query comprises first one or more clauses and a model clause. The model clause comprises a rule, and the rule comprises a left-side expression and a right-side expression. The right-side expression includes a window function. The term "left-side expression" refers broadly to an expression in the rule that references a set of cells, in the relation, to which values are assigned. The term "right-side expression" refers broadly to an expression in the rule that specifies how to compute the values that are assigned to the set of cells referenced by the left-side expression of the rule.

In one feature of this aspect, the left-side expression of the rule identifies one or more cells in a set of rows which is included the relation. The window function in the right-side expression of the rule further specifies one or more partition columns by which to partition the set of rows into partitions. When the database server executes the query to generate the relation, based on the left-side expression the database server determines the set of rows that is included in the relation. Based on the one or more partition columns, the database server partitions this set of rows into one or more subsets of rows. The database server then evaluates the window function over at least one of the one or more subsets of the set of rows.

In another aspect, a query that comprises a model clause is received. The model clause comprises a rule that includes a first left-side expression and a first right-side expression. The first left-side expression includes a for-loop predicate. The for-loop predicate indicates one or more iterations, where the one or more iterations identify one or more left-side expressions. The query is compiled. After compiling the query, the query is executed to generate a relation. During the step of executing the query, the for-loop predicate is unfolded by performing the one or more iterations. At each of the one or more iterations, the first left-side expression in the rule is substituted with the left-side expression identified by the current iteration, and the rule is then evaluated. In one feature of this aspect, the query may be a SQL query, and the model clause included in the query may be a SQL model clause.

In another aspect, a query that comprises a model clause is received. The model clause comprises a rule that includes a left-side expression and a right-side expression. The left-side expression includes one or more existential predicates, where each existential predicate evaluates to a Boolean value. The query is executed to generate a relation, where executing the query comprises evaluating the rule.

In one feature of this aspect, the model clause further comprises one or more dimension columns that correspond to columns in the generated relation. In this feature, each of the existential predicates corresponds to a dimension column of the one or more dimension columns included in the model clause, and each of the existential predicates is evaluated by applying that existential predicate to one or more dimension values.

Other aspects encompass computer-readable media and apparatuses configured to carry out the foregoing steps.

For explanation purposes, the techniques for processing queries are described herein with reference to model clauses defined for SQL. However, the described techniques and methods may be applied to other database and/or query languages, such as, for example, XQuery (XML query language) and Query-By-Example (QBE). Further, for explanation purposes the steps of the techniques and methods are described herein as being performed by a database server. However, the described techniques and methods may be performed by any computer system or application that is capable of processing queries, such as, for example, a web server and a desktop DBMS application. Moreover, in some embodiments the described techniques and methods may be performed by a cluster that comprises a plurality of such computer systems or applications. In addition, the described techniques and methods may be performed by systems that may or may not provide support for MOLAP services, Relational OnLine Analytical Processing (ROLAP) services, or Hybrid OnLine Analytical Processing services. Thus, the example embodiments described herein are to be regarded in an illustrative rather than a restrictive sense.

II. Window Functions in Model Clauses

As referred to herein, a "window function" is any function that includes an OVER clause. For example, the function "SUM(salary)OVER PARTITION BY deptno" is a window function that computes a sum of the values in a "salary" column over partitions, or sets of rows, that are determined by the values in a "deptno" column. Window functions may be any windowing functions that can be used with an OVER clause to compute cumulative, moving, and centered aggregates, ranking and distribution functions, or lag/lead functions over a range, or a "window", of values and/or of rows that are included in a relation. When evaluated, a window function returns a value for each row in the relation, which value may depend on other rows in the corresponding window. For example, in one embodiment the following windowing functions, when used with an OVER clause, may constitute window functions: moving sum ("SUM"), moving average ("AVG"), moving minimum and maximum ("MIN" and "MAX"), and cumulative sum ("COUNT"). In this embodiment, the standard deviation ("STDDEV") and variance ("VARIANCE") statistical functions may also be supported as window functions. In addition, this embodiment may also support as window functions two other functions that operate on "windows" of values: "FIRST_VALUE", which returns the first value in the window; and "LAST_VALUE", which returns the last value in the window. In general, a window function may be any function that includes an OVER clause, such as, for example, ranking or distributing functions, reporting aggregate functions, and lag or lead functions.

In some approaches used by DBMS to support SQL, window functions can be used only in the SELECT, ORDER BY, and GROUP BY clauses of a SQL query. Moreover, in some implementations that support SQL model clauses, window functions are allowed in the PARTITION BY, DIMENSION BY, or MEASURE BY definitions of the model clause, but are not allowed in the right-side expression of a model clause rule. In these implementations, use of a window function in the right-side expression of a model clause rule raises a syntax error.

Further, in some approaches, window functions are evaluated over the entire set of rows that is identified by the clauses of the query. In a SQL query, for example, the set of rows identified by the SELECT, FROM, and WHERE clauses of the query is first stored in a buffer. Thereafter, any window functions identified in the SELECT, ORDER BY, or GROUP BY clauses of the query are performed on all the rows in the buffer. This may cause significant performance degradation for queries that return a number of rows so large that sorting the rows in the buffer and/or evaluating the window functions cannot be performed in memory and must be spilled to disk or to other persistent storage.

To address the above deficiencies, enhancements to model clauses are described herein that provide for efficient processing of window functions that are included in rules specified in the model clauses.

Window Functions in a Model Clause Rule

The following query Q2 may be processed in one embodiment:

```
Q2.  SELECT  *
     FROM    employees
     MODEL
             DIMENSION BY (deptno, empno)
             MEASURE BY (salary, hiredate, commission, 0 WF)
     RULES
     (WF[10, ANY] = SUM(salary) OVER
                    (PARTITION BY deptno ORDER BY hiredate),
     WF[deptno<>10, ANY] = AVG(salary) OVER
                    (PARTITION BY deptno ORDER BY empno))
```

Query Q2 is a SQL query that comprises a SELECT clause, FROM clause, and a MODEL clause. The model clause comprises two dimension columns, "deptno" and "empno", and four measure columns. The measure columns "salary", "commission", and "hiredate" are columns in the underlying table "employees", which holds the data over which the model clause is evaluated. The measure column "WF" is a computed measure that is evaluated over the salaries of all employees in a given department.

The model clause in query Q2 also includes two rules. The first rule computes the cumulative sum of the salaries of employees in the department with department number "10" with respect to increasing employee hiredate. This rule comprises a left-side expression ("WF[10, ANY]") which identifies a set of cells in the resulting relation. The right-side expression of this rule includes a window function ("SUM") which is computed over partitions defined by the values for the "deptno" column in the left-side expression of the rule. The second rule computes the cumulative average of the salaries of all employees in departments other than the department with department number "10" with respect to increasing employee number within each department. This rule also comprises a left-side expression ("WF[deptno<>10, ANY]") and a right-side expression. The right-side expression of this second rule includes the window function "AVG", which is also computed over partitions defined by the values for the "deptno" column in the left-side expression of the rule.

The relation generated by executing query Q2 is shown in Table 2 below. The elipses in the cells of the relation indicate one or more records that are not shown.

TABLE 2

| Relation generated by executing query Q2 | | | | | |
| --- | --- | --- | --- | --- | --- |
| DeptNo | EmpNo | Salary | HireDate | Commission | WF |
| 10 | 121 | 40,000 | 7-12-1999 | 25,120 | 40,000 |
| 10 | 422 | 35,500 | 8-28-1999 | 24,000 | 75,500 |
| 10 | 311 | 41,800 | 1-10-2000 | 28,000 | 117,300 |
| ... | ... | ... | ... | ... | ... |
| 10 | 511 | 33,000 | 2-23-2000 | 11,000 | 13,289,500 |
| 20 | 1010 | 113,800 | 3-31-1990 | 0 | 113,800 |
| 20 | 1011 | 110,000 | 2-20-1990 | 0 | 111,900 |
| ... | ... | ... | ... | ... | ... |
| 20 | 1242 | 85,500 | 1-02-1998 | 0 | 104,250 |
| 30 | 4100 | 66,500 | 11-13-2001 | 0 | 66,500 |

TABLE 2-continued

| Relation generated by executing query Q2 | | | | | |
| --- | --- | --- | --- | --- | --- |
| DeptNo | EmpNo | Salary | HireDate | Commission | WF |
| 30 | 4101 | 57,000 | 11-13-2001 | 0 | 61,750 |
| ... | ... | ... | ... | ... | ... |
| 30 | 4290 | 49,300 | 12-10-2002 | 0 | 58,380 |

The relation depicted in Table 2 is generated by a database server that receives and executes query Q2. In processing query Q2, the database server first determines a result set of rows based on the SELECT and FROM clauses of the query. This result set of rows is depicted in FIG. 1.

Referring to FIG. 1, result set 100 is shown. Result set 100 is not the relation returned by the database server in response to executing query Q2. Rather, result set 100 is an internal block of rows based on which the database server generates the relation specified in the model clause of query Q2. Result set 100 includes the rows identified by the SELECT and FROM clauses of query Q2, which rows include all rows in the "employees" table. (Had query Q2 included additional clauses, such as a WHERE clause or an ORDER BY clause, the rows in result set 100 would have reflected the conditions specified in these additional clauses.)

Each row in result set 100 includes columns 102 ("DeptNo"), 104 ("EmpNo"), 106 ("HireDate"), 108 ("Commission"), and 110 ("Salary"). The ellipsis depicted in FIG. 1, such as ellipsis 117, indicates one or more rows that are not shown in the figure. According to the techniques described herein, for any particular rule included in query Q2 the database server first determines a set of rows in result set 100, which set of rows is identified based on dimension column values specified in the left-side expression of that rule. Next, the database server partitions the set of rows into partitions based on the values of the partition columns in that set of rows, where the partition columns are specified in the window function of that rule. This is followed by computation of the window functions within each partition.

For example, in order to evaluate the first rule in the model clause of query Q2, the database server first determines the rows in set of rows 112. Set of rows 112 includes all rows of result set 100 with a value in "DeptNo" column 102 of "10" as indicated by the left-side expression of the first rule, which specifies that the window function on the right-side expression of this rule ("SUM") is to be evaluated only for employees in the department with "DeptNo" value of "10". Next, the database server determines whether to partition the rows in set of rows 112 according to the values of the "DeptNo" column 102 included in that set. Since "DeptNo" column 102 has only one distinct value ("10") in the set of rows 112, no further partitioning of that set is necessary and the window function ("SUM") of the first rule is evaluated over the entire set of rows 112. Specifically, for each row in the set of rows 112, the database server adds the value of the column 110 ("Salary") to the moving sum of the employee salaries and stores the obtained value in the "WF" column of the resulting relation, as shown in Table 2. The addition of the values in column 110 is performed in an increasing order determined based on the values stored in "HireDate" column 106.

In order to evaluate the second rule in the model clause of query Q2, the database server first determines the rows that are in set of rows 114. Set of rows 114 includes all rows of result set 100 with a value in "DeptNo" column 102 of "20" or "30" as indicated by the left-side expression of the second rule, which specifies that the window function on the right-side expression of this rule ("AVG") is to be evaluated only for employees in the departments with "DeptNo" values different than "10". Next, the database server partitions set of rows 114 according to the values of the "DeptNo" column 102 included in that set. Since the values of "DeptNo" column 102 included in set of rows 114 are "20" and "30", the database server partition set of rows 114 in two partitions, partition 115A and partition 116A. Partition 115A includes the rows of the set of rows 114 for which the value in "DeptNo" column 102 is "20", and partition 116A includes the rows of the set of rows 114 for which the value in "DeptNo" column 102 is "30". (In FIG. 1, line 119 depicts the logical boundary between the rows in partitions 115A and 116A.) The window function "AVG" in the right-side expression of the second rule of query Q2 is then evaluated separately over each of partitions 115A and 116A. Specifically, as illustrated by arrow 115B, the window function "AVG" is first evaluated over the rows in partition 115A, in which column 102 ("DeptNo") is equal to "20", by computing for each row the moving average of the employee salaries in an order determined based on the values stored in "EmpNo" column 106. The computed value of the moving average for each row is stored in the "WF" column of the resulting relation, as shown in Table 2. As illustrated by arrow 116B, the "AVG" window function is then separately evaluated over the rows in partition 116A, in which column 102 ("DeptNo") is equal to "30", by computing for each row the moving average of the employee salaries in an order determined based on the values stored in "EmpNo" column 106. The computed value of the moving average of each row is stored in the "WF" column of the resulting relation, as shown in Table 2.

Thus, the techniques described herein allow for computing window functions that are specified in the right-side expression of a model clause rule. Furthermore, instead of computing the window functions over the entire set of rows identified based on dimension column values specified in the left-side expression of the rule, the techniques described herein provide for evaluation of the window functions only on relative subsets of the rows that are to be modified by the respective rules. This mechanism provides for a more efficient evaluation of window functions than it is possible in conventional DBMS as it avoids making unnecessary computation that are to be filtered out later.

Evaluating Window Functions Included in Model Clause Rules

In one embodiment, window functions included in model clause rules are evaluated by the same window function evaluation engine that is used to evaluate window functions included in other query clauses. For example, a database server that allows window functions in the SELECT, ORDER BY, and GROUP BY clauses of SQL queries may provide one or more modules (for example, window function components in a SQL Query Engine) for evaluating these window functions. In this embodiment, according to the techniques described herein, the same SQL Query Engine is used to evaluate window functions included in model clause rules.

In this embodiment, the SQL Query Engine is used as a service by the SQL Model Clause engine. The SQL Model Clause engine may be implemented as one or more modules that evaluate model clauses to generate relations. According to the techniques described herein, a SQL query that includes a model clause with a rule having a left-side expression and a right-side expression is received. The model clause specifies one or more partition columns in its PARTITION BY definition. A result set of rows is first identified based on the SELECT, FROM, WHERE, ORDER BY, or GROUP BY clauses that are included in the query. The result set of rows is stored by the SQL Model Clause engine in a hash table.

The SQL Model Clause engine then partitions the result set of rows into one or more subsets based on the values of the one or more partition columns specified in the PARTITION BY definition of the model clause. The SQL Model Clause engine evaluates all the rules in the model clause for each partition, one partition at a time, to generate the final result for a partition before proceeding to the next partition. When evaluating the rules for a partition, the SQL Model Clause engine sends separately each subset of rows, along with the window function included in the right-side expression of the rule, to the SQL Query Engine. The SQL Query Engine then partitions each subset into one or more partitions based on the one or more partition columns that may be included in the OVER clause of that window function. Thus, if the partition columns specified in the PARTITION BY definition of the model clause store a large number of distinct values or if the result set includes a large number of rows, partitioning the result set into subsets provides for breaking a potentially huge sort (which may otherwise be performed by the SQL Query Engine over the large result set) into manageable smaller sorts.

The SQL Query Engine evaluates the window function over each corresponding subset of rows and returns the results to the SQL Model Clause engine in an internal structure. The SQL Model Clause engine then joins this internal structure to the hash table that stores the result set of rows from the underlying query. Based on information included in the internal structure, for each cell identified by the left-side expression of the rule, the SQL Model Clause engine evaluates the right-side expression of the rule and assigns the value to the corresponding cell.

In this way, the optimizations provided by the SQL Query Engine for regular SQL window functions are made available in the evaluation of SQL model clauses. Moreover, the SQL Model Clause engine identifies subsets of the result set of rows and passes these subsets to the SQL Query Engine along with any other information that is required to compute the window functions. The smaller subsets processed by the SQL Query Engine consume less memory and other computing resources, and generally avoid spilling of data pages to disk which improves performance. The SQL Query Engine component that evaluates window functions performs all necessary sorts and computations, and returns the results to the SQL Model Clause engine in an internal structure. The results are set of rows which have the dimension keys and the window function results. The SQL Model Clause engine identifies one or more cells using the dimension keys, evaluates the right-side expressions of the rule using the window function results, and assigns the computed values to the cells that were looked up.

According to the techniques described herein, in one embodiment the right-side expression of a rule may include multiple window functions. The multiple window functions in the right-side expression of the rule are all evaluated over the same set of cells that are identified by the left-side expression of the rule. The information required to compute each window function may be sent separately to the SQL Query Engine. However, if the multiple window functions can be computed by using the same sort, the SQL Model Clause engine may send the window functions together for evaluation by the SQL Query Engine. The SQL Query Engine computes each window function over the corresponding subset of rows, and sends the results back to the SQL Model Clause engine.

The techniques for evaluating window functions described herein provide for partitioning the result set of rows returned by the underlying query before evaluating the window functions. By first partitioning the result set of rows, and then evaluating the window functions, the techniques provide a mechanism for breaking up a potentially large result set of rows with diverse partitioning values into multiple smaller and manageable sets over which the window functions are evaluated. The techniques for evaluating window functions described herein fit well into the overall evaluation of model clauses. Because the relations to which the model clauses are evaluated may be partitioned anyway, the smaller partitions have a better chance of fitting and being processed in memory than the larger original result set. This results in a more efficient evaluation of the window functions and in an improved overall performance. The improved performance is achieved because generally performing more operations in memory on smaller rowsets is more efficient than processing a large rowset by spilling portions of it to disk.

Optimization of Window Function Evaluation

In a DBMS, window functions may be processed over the entire result set of rows that is determined by the clauses of the query. The result set of rows include all columns that are returned by the query, and if the result set needs to be sorted as part of evaluating a window function, the sort operation is performed over rows that include all the columns because the columns are needed in later processing.

For example, consider the following query Q3:

| Q3. | SELECT | empno, salary, deptno, commission, hiredate, SUM(salary) OVER (PARTITION BY deptno) |
|---|---|---|
| | FROM | employees |

The computation of the window function "SUM" in query Q3 requires only the "salary" and "deptno" columns. The rows returned by the query are sorted on the "deptno" column and the moving sum aggregate is computed over the "salary" column. However, the evaluation of the window function is performed over rows that include all the rest of the columns returned by the query, namely "empno", "commission", and "hiredate". This increases the size of the rows and may cause the sort operation to spill the sorted rows to disk if the set of rows is so large that it cannot fit in volatile memory. The problem of spilling to disk can cause users to avoid using window functions (such as reporting aggregates) when there are too many columns or expressions to carry around.

The techniques described herein for evaluating window functions in model clauses provide for evaluating window functions by carrying around only those columns that are necessary for performing the evaluation and any dimension columns that are referenced in the left-side expression of the rule. The columns that are not necessary to perform window function computations are kept aside when the window functions are computed. Each row of cells identified by the left-side expression of the rule, for which a window function needs to be computed, is associated with a set of dimensions column values. When the window function computations are complete, each row of cells is also associated with the window functions results for that row, which results are used to evaluate the right-side expression of the rule. The set of dimension column values are used to look-up the cells which are to be modified, and the window function results are used to modify the values of these cells. Thus, this technique makes the rows over which the window functions are evaluated much smaller, which reduces the amount of memory used and thus reduces the chances of spilling rows to disk.

For example, suppose that a query received for execution by a database server includes a model clause. The model clause comprises one or more dimension columns that correspond to the columns of a relation that is generated as a result of executing the query and evaluating the model clause. The model clause also comprises a rule, the right-side expression of which indicates one or more window functions. Each of the one or more window functions indicates one or more columns over which that function is to be evaluated.

According to the techniques described herein, a column vector is identified for each window function that is to be evaluated. The column vector includes only the columns over which that window function is to be evaluated and the dimension columns that may be indicated by the left-side expression of the rule. In other words, the column vector includes the data needed for window function computation along with dimension key values so that the results of the window function computation can be associated back to the cells in the relation via cell lookups.

In order to evaluate each window function, a row source over which that window function is to be evaluated is generated. A row source is a relational operation that produces a set of rows. The rows in the row source include only the columns of that column vector which is identified for that window function. Each window function is then evaluated over its row source and the computed values are stored in the row source as indicated by the dimension columns. Once the evaluation of the window functions is complete, the relation corresponding to the model clause is evaluated by evaluating the rule and updating the cells in the relation based on the values stored in the row sources corresponding to the window functions. The columns which may have been left out from the row sources during the evaluation of the window functions are included in the relation by joining the relation to the row sources over the dimension columns.

In one embodiment, the following query Q4 may be processed:

| Q4. | SELECT | empno, salary, deptno, commission, hiredate |
|---|---|---|
| | FROM | employees |
| | MODEL | DIMENSION BY (deptno, empno) |
| | | MEASURE BY (salary, hiredate, commission, 0 WF) |
| | RULES | |
| | (WF[10, ANY] | = SUM(salary) OVER |
| | | (PARTITION BY deptno ORDER BY hiredate), |
| | WF[20, ANY] | = AVG(salary) OVER |
| | | (PARTITION BY deptno ORDER BY empno)) |

To process query Q4, a result set of rows is first determined based on the SELECT and FROM clauses in the query. The result set includes all rows in the "employees" table, and each row of the set includes the columns "empno", "salary", "deptno", "commission", and "hiredate". The result set of rows is stored in a hash table. The model clause of the query identifies the columns "deptno" and "empno" as dimension columns. The two rules in the model clause of query Q4 include two window functions: the "SUM" window function in the first rule and the "AVG" window function in the second rule.

In order to evaluate these window functions, the result set of rows is first partitioned into subsets on the "deptno" column, where each subset corresponds to a partition of the relation which is generated as a result of executing query Q4. For each window function in the rules of the model clause, a column vector is identified, where the column vector includes only columns that are necessary for evaluating that window function. For example, the column vector for the "SUM" window function includes the "deptno", "empno", "salary", and "hiredate" columns. (The "empno" column is included in the column vector because it is identified as a dimension column in the model clause.) The column vector for the "AVG" window function includes the "deptno", "empno", and "salary" columns.

The row sources over which each rule is evaluated are then created. For each rule, the input set of rows to the row source is determined by identifying a set of rows based on the values of the dimension columns identified by the left-side expression of the rule, and then partitioning this set of rows over the values in the partition columns specified in the window function of that rule. An input row for the row source for each rule contains only those columns that are identified in the column vector corresponding to the window function in that rule. For example, the input rows to the row source for the "SUM" window function are generated from all rows from the set of rows where the "deptno" column stores a value of "10". Each input row for this row source contains only the "deptno", "empno", "salary", and "hiredate" columns. Thus, the input rows for the row source of the "SUM" window function does not contain the "commission" column which is not necessary for evaluating the window function. The input rows to the row source for the "AVG" window function are generated from the set of rows where the "deptno" column stores a value of "20". Each input row to this row source contains the "deptno", "empno", and "salary" columns. Thus, the input row to the row source for the "AVG" window function does not contain the "commission" and "hiredate" columns which are not necessary for evaluating this window function.

Each window function is then evaluated over its respective set of input rows by its row source. The row source returns an output set of rows that contain the result for the window function along with the dimension columns of the model clause. The dimension columns are then used to look up the cells that are to be modified after the window function result is substituted in the right-side expression and the whole right-side expression is evaluated.

Partition-Wise Computation of Multiple Window Functions

In some DBMS, a window function is evaluated over the entire result set of rows that comes from the underlying query. For example, the aggregations, joins, sorts, etc., that are specified by the SELECT, FROM, WHERE, ORDER BY, and GROUP BY clauses of a SQL query are completed first, and then any window function specified in the query is computed over the entire result set of rows. If a particular query has more than one window function, then all window functions are computed on the entire result set of rows that is returned by the underlying query, even though each window function may have to be computed only over a particular portion of the result set.

For example, consider the following SQL query Q5:

```
Q5.   SELECT empno, salary, deptno, hiredate
      CASE WHEN deptno = 10 THEN
              SUM(salary) OVER
                 (PARTITION BY deptno ORDER BY hiredate)
```

-continued
```
      ELSE SUM(salary) OVER
              (PARTITION BY deptno ORDER BY empno)
      FROM employees
```

Query Q5 has two "SUM" window functions, each of which is to be computed over a different partition of the result set of rows returned by the query. (The first "SUM" function needs to be computed only for employees in department "10", while the second window function needs to be computed for all employees in each department that is different than department "10").

Normally, the two "SUM" window functions would be computed for all rows in the result set of rows regardless of the value in the "deptno" column. When the computation of the two "SUM" window functions is complete, the rows that are not necessary are discarded from the results for each function. For example, the first "SUM" window function is computed and stored for all rows in the result set of rows returned by query Q5, and then the rows that have a value in the "deptno" column that is different than "10" are discarded. Similarly, the second "SUM" window function is computed and stored for all rows in the result set of rows returned by query Q5, and then the rows that have a value in the "deptno" column that is equal to "10" are discarded. This manner of evaluating window functions, however, results in a large number of unnecessary computations.

The techniques described herein provide for avoiding any unnecessary computations by evaluating each window function only over the particular partition or partitions over which that window function needs to be evaluated. This is accomplished by using a model clause that includes rules with window functions in the right-side expression of the rule.

For example, query Q5 may be written by using a model clause in the following way as query Q6:

```
Q6.   SELECT   empno, salary, deptno, hiredate, WF
      FROM     employees
      MODEL    DIMENSION BY (deptno, empno)
               MEASURE BY (salary, hiredate, 0 WF)
      RULES
      (WF[10, ANY] = SUM(salary) OVER
                        (PARTITION BY deptno ORDER BY
                        hiredate),
       WF[deptno<>10, ANY] = SUM(salary) OVER
                        (PARTITION BY deptno ORDER BY
                        empno))
```

By executing query Q6 instead of query Q5, unnecessary computations in the evaluation of the window functions in query Q5 are avoided. For each rule in query Q6, the set of rows identified by the values of the dimension columns in left-side expression of that rule is determined first. Then, for each rule, the set of rows identified for that rule is partitioned based on the values of the partition column in that set, which partition column is specified in the window function of that rule. Then, for each rule, the window function in the right-side expression of that rule is evaluated separately over each portion. For example, in order to evaluate the "SUM" window function in the right-side expression of the second rule, the set of rows corresponding to the cells identified by the left-side expression of that rule is identified (i.e. the set of rows for which the value in the "deptno" column is different than "10"). Then, this set of rows is partitioned in one or more partitions based on the distinct values stored in the "deptno" column of the set (because the "deptno" column is identified as a partition column in the OVER clause of the "SUM" window function in the second rule). The "SUM" window function in the right-side expression of the second rule is then evaluated separately for each partition.

III. Unfolding For-Loops in Model Clause Rules at Run-Time

In some implementations that support processing of queries with model clauses, for-loop predicates were allowed in the left-side expressions of rules included in the model clauses. A for-loop predicate is an expression that indicates one or more iterations. There are different types of for-loop predicates, such as, for example, list-based for-loop predicates and increment-based for-loop predicates. For example, the expression "FOR x IN (value1, value2, . . . , valueN)" is an example of a list-based for-loop predicate, where the predicate indicates "N" iterations in which each of the listed values is assigned to the variable "x". The expression "FOR x FROM begin_value TO end_value INCREMENT BY n" is an example of an increment-based for-loop predicate, where the variable "x" is initially assigned the value "begin_value", and with each iteration the value of "x" is incremented by "n" until the value of "x" is greater than the value "end_value".

In these implementations that support processing of queries with model clauses, any for-loop predicates in the left-side expression of a rule are unfolded at compile-time to generate multiple rules that have single-valued references in place of the for-loop predicate. For example, unfolding the rule in the following model clause

```
MODEL DIMENSION BY (x, y) MEASURE BY (s, t)
RULES
(   s[FOR x FROM 1 TO 3 INCREMENT 1, NULL] =
        SUM(t)[CV(x), y>0] )
``` at compile-time results in replacing the rule with the following three rules:
RULES
(s[1, NULL]=SUM(t)[CV(x), y>0],
s[2, NULL]=SUM(t)[CV(x), y>0],
s[3, NULL]=SUM(t)[CV(x), y>0])
where "CV(x)" means the current value for "x" in the left-side expression of the rule. Thus, at compile-time, the unfolding of a rule with a for-loop predicate into multiple rules is a process that involves cloning the right-side expression of the rule and generating a new left-side expression that has the for-loop predicate replaced with a value generated by an iteration of the for-loop predicate.

Further, some implementations allow the iterations in a for-loop predicate to be based on a subquery. Since the for-loop predicate is unfolded at compile-time, any subquery on which interations of the for-loop predicate may be based is also unfolded at compile-time. For example, unfolding the following rule
RULES
(s[FOR x IN (SELECT x_val FROM x_table), NULL]=0)
at compile-time involves a two-step process. In the first step, the subquery is evaluated. The values returned from the subquery are stored in an internal data structure, which represents the execution plan of the subquery. Suppose that the subquery returns three values: "1", "3", and "5". In the second step, the rule is replaced with the following three rules:
RULES
(s[1, NULL]=0,
s[3, NULL]=0,
s[5, NULL]=0)

Compile-time unfolding of rules with for-loop predicates has some disadvantages. One disadvantage is that compile-time unfolding of a rule with a for-loop predicate may result in a large number of rules in the model clause. This may be a serious problem for implementations which impose an upper-limit on the number of rules allowed in the model clause. Another disadvantage is that a large number of rules in a model clause at compile-time may cause the compile-time analysis of the model clause to take a very long time (sometimes even minutes), and to consume a large amount of computing resources such as memory and CPU time. Another disadvantage of compile-time unfolding of rules with for-loop predicates is that the for-loop predicates cannot include expressions that can only be obtained at run-time, such as, for example, reference spreadsheet look-ups, nested references, etc.

Compile-time unfolding of rules with for-loop predicates that include a subquery has yet another disadvantage. Since the subquery is evaluated at compile-time and the values are generally used at run-time, the results returned by the subquery must be stored until the execution of the outer query is completed in order to preserve data and execution consistency. This means that the execution plan of the subquery is not shareable and cannot be used to evaluate other subqueries or other portions of the same or different outer query.

To address the above disadvantages, enhancements to model clauses are described herein that provide for run-time unfolding of rules that include for-loop predicates.

Overview

FIG. 2 is a flow diagram that illustrates a high level overview of one embodiment for processing queries that involves run-time unfolding of for-loop predicates.

In step 202, a query is received. The query includes a model clause that comprises at least one rule. The rule includes a first left-side expression and a first right-side expression. The first left-side expression includes a for-loop predicate that indicates one or more iterations. The one or more iterations identify one or more left-side expressions that may be combined with the first right-side expression to form multiple rules.

In step 204 the query is compiled. In some embodiments, at this step a determination is made whether to unfold any for-loop predicates in the model clause rules at compile-time or at run-time. The determination may be based on one or more criteria, parameters, or heuristics. If a determination is made to unfold the for-loop predicates at run-time, then the for-loop predicates are not unfolded at compile time. In other embodiments, any for-loop predicates in the model clause rule are always unfolded at run-time.

After the query is compiled, in step 206 the query is executed to generate a relation. Generating the relation generally involves evaluating each rule included in the model clause and creating the corresponding relation. Any rule with a for-loop predicate is unfolded during this step 206 of executing the query. As depicted in FIG. 2, in one embodiment step 206 comprises sub-steps 206A, 206B, 206C, 206D, 206E, and 206F.

In sub-step 206A, the for-loop predicate, which is included in the first left-side expression of the rule in the model clause, is unfolded by performing the one or more iterations indicated by the predicate.

For each iteration, sub-steps 206B, 206C, 206D, 206E, and 206F are performed. In sub-step 206B, a current iteration of the for-loop predicate is identified. In sub-step 206C, a left-side expression is constructed from the values identified by the current iteration of the for-loop predicate. In sub-step 206D, the first left-side expression in the rule is substituted with the left-side expression constructed in sub-step 206C. In sub-step 206E, the rule (which at this point includes the constructed left-side expression and the first right-side expression) is evaluated. In sub-step 206F, a determination is made of whether there are any more iterations in the for-loop predicate. If there are more iterations left in the for-loop predicate, then control is passed back to sub-step 206B to identify and process the next iteration in the for-loop predicate. If in sub-step 206F it is determined that there are no more iterations in the for-loop predicate, then the unfolding of the for-loop predicate is completed and control passes to step 208.

In step 208, any other processing is performed. Such other processing may include performing any operations that are related to, or follow, the execution of the query.

In some embodiments, the steps of the method illustrated in FIG. 2 may be performed by a database server. Further, the query that includes a model clause with a rule that has a for-loop predicate may be a SQL query.

Unfolding of For-Loop Predicates for Rules with Qualified Dimension References

In some embodiments, a model clause rule with for-loop predicates is unfolded at run-time only if the left-side expression of the rule that includes the predicate is qualified. A left-side expression is qualified if all its dimension references, which correspond to dimension columns specified in the model clause, are for-loop predicates or evaluate to single values. If at least one dimension reference is in the form of an existential predicate that evaluates to a Boolean value, then any for-loop predicates that are dimension references corresponding to other dimension columns in the left-side expression are unfolded at compile-time. The determination of whether a left-side expression includes dimension references that are existential predicates is usually made at compile-time.

For example, in the following model clause:

```
MODEL DIMENSION BY (x, y, z) MEASURE BY (0 s, t)
RULES
  ( s[FOR x IN (1,2), FOR y IN (10, 20), ANY] =
              SUM(t)[CV(x), CV(y), ANY] )
``` the rule includes the existential predicate "ANY" that is a reference to dimension column "z". "ANY" is an existential predicate because it evaluates to a Boolean value of "TRUE" for any value that may be stored in dimension column "z". Further, the for-loop predicates "FOR x IN (1, 2)" and "FOR y IN (10, 20)" are qualified because when unfolded they evaluate to single values.

However, in these embodiments, the for-loop predicates in the following model clause:

```
MODEL DIMENSION BY (x, y, z) MEASURE BY (0 s, t)
RULES
  ( s[FOR x IN (1,2), FOR y IN (10, 20), "30"] =
              SUM(t)[CV(x), CV(y), ANY])
``` are unfolded at run-time because the rule includes only for-loop predicates or qualified references. (In the rule, the reference to dimension column "z" is qualified because it evaluates to the single value "30".)

Unfolding of For-Loop Predicates with Subqueries

In some embodiments, the techniques described herein for run-time unfolding of for-loop predicates provide for the run-time evaluation of any subqueries that may be included in the for-loop predicates. This run-time evaluation of for-loop predicate subqueries overcomes the disadvantages of the compile-time evaluation of subqueries. Further, when subqueries included in for-loop predicates are evaluated at run-time, the execution plan of these subqueries is reported in the execution plan of the outer query. Thus, a user or a database administrator is provided with the ability to review how these subqueries are evaluated and, if necessary, to correct the execution plan by including optimization hints in the query.

For example, consider the following model clause which may be included in a query processed in these embodiments:

```
MODEL DIMENSION BY (x, y) MEASURE BY (0 s, t)
RULES
  ( s[FOR x IN  (SELECT cdval FROM code_table),
      FOR y IN  (SELECT cdval FROM code_table)] =
              SUM(t)[CV(x), CV(y)])
```

In this model clause, the left-side expression of the rule includes, as references to the two dimension columns "x" and "y", two for-loop predicates that include the same subquery. The subquery retrieves the values of column "cdval" in table "code_table". The retrieved values are then used to unfold the two for-loop predicates.

Since the for-loop predicates are unfolded at run-time, the subqueries included in the for-loop predicates are also evaluated at run-time. Specifically, the subquery "SELECT cdval FROM code_table" is compiled at compile-time, and an execution plan for the subquery is stored in an internal data structure. The subquery, however, is executed once at run-time, and the values in the "cdval" column of the "code_table" are returned. Since the subquery is executed at run time, its execution plan is shareable and the returned values may be used to evaluate any portion of the outer query in which the above model clause is included. Thus, the returned values are used in order to unfold the two for-loop predicates "FOR x IN (SELECT cdval FROM code_table)" and "FOR y IN (SELECT cdval FROM code_table)". In this way, both for-loop predicates are unfolded at run-time based on a single execution of the subquery included in them.

IV. Existential UPSERT Rules

In some implementations that support processing of queries with model clauses, a rule can specify an UPSERT operation only if the dimension references included in the left-side expression of the rule are qualified predicates. If at least one dimension reference is, or includes, an existential predicate, the rule is considered to involve an UPDATE operation and is evaluated accordingly.

The enhancements to model clauses described herein overcome this restriction and provide for performing UPSERT operations for rules that include existential predicates in their left-side expressions.

UPSERT and UPDATE Operations

A query that includes a model clause rule evaluates to a relation. An UPSERT operation specified in the rule creates new cells within a partition of the relation if the cells do not exist; otherwise, the UPSERT operation updates the existing cells. An UPDATE operation specified in the rule updates existing cells in the relation and ignores non-existent cells.

To illustrate the difference between the UPSERT and UPDATE operations, consider the following query Q7:

```
Q7.  SELECT  *
     FROM    sales_facts
     MODEL   PARTITION BY (region)
             DIMENSION BY (product, time)
             MEASURE BY (sales)
     RULES
         ( UPSERT sales['tv', 2000] =  sales['red-tv', 2000] +
                                       sales['blue-tv', 2000]   )
```

The UPSERT operation specified in the rule of query Q7 will create a cell in each partition of the resulting relation, where the cell is included in a row that stores the value "tv" in the "product" column and the value "2000" in the "time" column, if this cell is not present in the relation. If this cell is already present in the relation (for example, because a value for the cell is stored in the underlying table "sales_facts"), the UPSERT operation will update the value of this cell. If the rule in query Q7 specified UPDATE operation instead of UPSERT, then the UPDATE operation will update the value of the cell if the cell already exists in the relation, and will do nothing if the cell does not exist in the relation.

Qualified and Existential Predicates

A qualified predicate is a value expression that generates a single value. Qualified predicates may be single-value expressions, such as, for example, constants, binds, single cell look-ups, or any other expressions that generate single values, such as, for example, qualified for-loop predicates (which may include in-lists with subqueries).

An existential predicate evaluates to a Boolean value when the predicate is applied on one or more dimension values. (A dimension value is a value that can be stored in a dimension column). A Boolean value is either TRUE or FALSE. Existential predicates may be value expressions that specify comparison, logical, or other operations, which take one or more dimensions values as input parameters and which evaluate to Boolean TRUE or FALSE values. For example, the existential predicate "(y=1 AND y=2)" consists of two comparison operations and returns FALSE for all possible values for dimension "y" since a value cannot be equal to "1" and "2" at the same time. In another example, the predicate "ANY" is an existential predicate because it evaluates to a Boolean TRUE for any dimension value.

Consider, for example, the following model clause:

```
MODEL   DIMENSION BY (x, y, z)
        MEASURE BY (s, t)
RULES
    ( UPSERT s[x=1, 1, 1] = 1,
      UPSERT s[2, 2, 2] = 2 )
```

In the above model clause, both rules specify an UPSERT operation. However, the first rule includes the existential predicate "x=1" as a reference to dimension column "x". The predicate "x=1" is a comparison operation that may return at least two values: "TRUE" if the value of dimension column "x" for the current row is "1", and "FALSE" otherwise. In some implementations, the above model clause will raise an error because an UPSERT operation cannot be performed for a rule that includes an existential predicate in its left-side expression. In other implementations, instead of raising an error, the UPSERT operation specified in the first rule above is automatically analyzed and processed as an UPDATE operation.

Multi-Dimensional Densification with UPSERT Rules

Model clause rules that specify UPSERT operations are useful in providing multi-dimensional densification. Multi-dimensional densification, as referred to herein, means the insertion of rows calculated based on existing values in dimension columns across multiple dimensions. In some implementations, it is not possible to achieve multi-dimensional densification with a single model clause because existential predicates are not allowed as dimension references in the left-side expression of the rules of the model clause.

Multi-dimensional densification is achieved by an operation referred to herein as "insertion of calculated members". This operation is typically effectuated by an UPSERT rule that allows existential predicates as dimension references in the left-side expression of the rule. Processing such an UPSERT rule according to the techniques described herein results in creating or updating a set of rows in the resulting relation, where there is a row in the set of rows that stores each combination of the input values of the existential predicates in the corresponding dimension columns.

To illustrate densification over a single dimension, consider the following example. A cube stores the sales values for dimensions city, time, and product. A user wants to insert new sales figures as "Bay Area" sales by combining the sales figures for each year and each product for the three cities San Francisco, San Jose, and Oakland. The following model clause may be used for this purpose:

```
MODEL   PARTITION BY (product, time)
        DIMENSION BY (city)
        MEASURE BY (sales s)
RULES UPSERT
    ( s['Bay Area'] =  s['San Francisco'] + s['San Jose'] +
                       s['Oakland'] )
```

In this model clause, the "Bay Area" rows are calculated members where a new value in the dimension column "city" is inserted in the cube for all existing values of the dimension columns "product" and "time".

In some implementations, if a user wants such densification over more than one dimension, such densification may only be performed one dimension at a time by using a separate model clause for densification over each dimension. The reason for this is that existential predicates are not allowed in the left-side expression of the rule as dimension references. In these implementations, in order to perform such multi-dimensional densification over the city and time dimensions, a query with a set of cascading model clauses must be used. An example of such query is the following query Q8:

```
Q8.  SELECT product, time, city, s sales
     FROM
         ( SELECT    product, time, city, s sales
           FROM      sales_cube
           MODEL     PARTITION BY (product, time)
                     DIMENSION BY (city)
```

-continued

```
            MEASURE BY (sales s)
      RULES UPSERT
          ( s['Bay Area'] =   s['San Francisco'] +
                              s['San Jose'] + s['Oakland']
          )
      )
MODEL   PARTITION BY (product, city)
        DIMENSION BY (time)
        MEASURE BY (sales s)
    RULES UPSERT
        ( s['2004'] = s['2002'] + s['2003'] )
```

The above query adds "Bay Area" rows as calculated members of the city dimension, and "2004" rows as calculated members of the time dimension. This way of inserting calculated members consumes a large amount of memory, may involve a large number of unnecessary computations, and requires the creation of separate memory access structures (e.g. hash tables) for each model clause in the set of the cascading model clauses.

The techniques described herein overcome these disadvantages by providing for processing UPSERT operations for rules that include existential predicates in their left-side expressions. Such rules are also referred to herein as "existential upsert" rules.

An existential upsert rule includes, in its left-side expression, a combination of one or more existential predicates (in at least one dimension) and one or more qualified predicates (in one or more dimensions) as dimension column references. The existential upsert rule also specifies an UPSERT operation in a parameter included in the rule itself or in the model clause in which the rule is included. The distinct values for the one or more dimensions that are specified in the one or more existential predicates are generated by scanning the result set of rows that is generated as a result of executing the underlying query. The values for the zero or more dimensions that are specified in the zero or more qualified predicates are generated by evaluating the qualified predicates.

In some embodiments, a rule that specifies an UPSERT operation is considered an existential upsert rule by default. In other embodiments, in order to distinguish between existential UPSERT rules and regular, qualified UPSERT rules, a new option "UPSERT ALL" is introduced to identify an existential upsert rule. The "UPSERT ALL" option may be specified as a parameter of the rule itself or as a parameter of the model clause in which the rule is included.

Using existential upsert rules, the above query Q8 can be rewritten as query Q9 as follows:

```
Q9.   SELECT    product, time, city, s sales
      FROM      sales_cube
      MODEL     PARTITION BY (product)
                DIMENSION BY (time, city)
                MEASURE BY   (sales s)
          RULES UPSERT ALL
              ( s[ANY, 'Bay Area'] = s[CV( ), 'San Francisco'] +
                      s[CV( ), 'San Jose'] + s[CV( ), 'Oakland'],
              s['2004', ANY] = s['2002', CV( )] + s['2003', CV( )] )
```

In query Q9, the first rule includes, in its left-side expression, the existential predicate "ANY" as a reference to the "time" dimension column and the qualified predicate "Bay Area" as a reference to the "city" dimension column. Similarly, the second rule includes, in its left-side expression, the qualified predicate "2004" as a reference to the "time" dimension column and the existential predicate "ANY" as a reference to the "city" dimension column. (The function "CV( )" returns the value of the positionally referenced column for the current row.)

According to the techniques described herein, query Q9 is executed and a resulting relation is generated. First, a result set of rows is generated based on the SELECT and FROM clauses of the query. The result set of rows is then partitioned into one or more subsets of rows based on the "product" partition column, where a separate subset is identified for each distinct value of the "product" column in the result set of rows. The two rules are then evaluated separately over each subset of rows. In evaluating the first rule, as indicated by the UPSERT operation, a row with a value of "Bay Area" in the "city" column is inserted in the resulting relation for each distinct value in the "time" column of the particular subset of rows over which the rule is being evaluated. In evaluating the second rule, as indicated by the UPSERT operation, a row with a value of "2004" in the "time" column is inserted in the resulting relation for each distinct value in the "city" column of the particular subset of rows over which the rule is being evaluated.

The existential upsert rules in query Q9 involve the simple existential predicate "ANY". However, the techniques for processing existential upsert rules described herein are not limited to using the "ANY" predicate. Any existential predicate may be used in the left-side expression of a rule as a reference to a dimension column over which densification needs to be performed by using an existential UPSERT operation. Further, the techniques described herein allow for any number of existential and qualified predicates to be used as references to dimension columns in the left-side expression of an existential upsert rule.

To illustrate, consider the following query Q10:

```
Q10.  SELECT    p product, time, city, s sales
      FROM      sales_cube
      MODEL     DIMENSION BY (product p, time, city)
                MEASURE BY   (sales s)
          RULES UPSERT ALL (
      s[p IN   ('clothes', 'cosmetics'), time > '2000', 'Bay Area'] =
              s[CV( ), CV( ), 'San Francisco'] +
              s[CV( ), CV( ), 'San Jose'] +
              s[CV( ), CV( ), 'Oakland'],
      s[ANY,   '2004', ANY] =    s[CV( ), '2002', CV( )] +
                                 s[CV( ), '2003', CV( )] )
```

In query Q10, the rules are evaluated as follows. In evaluating the first rule, as indicated by the UPSERT operation, a row with a value of "Bay Area" in the "city" column is inserted in the resulting relation for each existing distinct combination of the values in the "product" and "time" columns, where the values in the "product" column are any of "clothes" and "cosmetics" and the values in the "time" column are greater than "2000". In evaluating the second rule, as indicated by the UPSERT operation, a row with a value of "2004" in the "time" column is inserted in the resulting relation for each existing distinct combination of the values in the "product" and "city" columns, where the values in the "product" column and the values in the "city" column are any values that are stored in the rows returned by the underlying query.

In some embodiments, a rule that is specified with the "UPSERT ALL" option must include at least one existential predicate and at least one qualified predicate as references to dimension columns in the left-side expression of the rule in order for the rule to be evaluated as an existential upsert rule. In these embodiments, if the rule specifies the "UPSERT ALL" option but does not include any existential predicates, then the rule is analyzed and processed as a regular UPSERT rule.

Examples of Using Existential Upsert Rules

Examples of using existential upsert rules are provided below. In these examples, queries Q11 and Q12 are executed against the following "sales_facts" table:

TABLE 3

Contents of the "sales_facts" table

| REGION | PRODUCT | TIME | SALES |
|--------|---------|-------|-------|
| SF | A | APRIL | 1 |
| LA | B | APRIL | 2 |
| SF | C | APRIL | 3 |
| SF | D | MAY | 4 |

The following query Q11 is executed against the "sales_facts" table:

```
Q11.  SELECT        region, product, time, sales
      FROM          sales_facts
      MODEL         DIMENSION BY (region, product, time)
                    MEASURE BY   (sales)
      RULES UPSERT
         ( sales[ANY, ANY, 'JUNE']  = 5,
           sales[ANY, ANY, 'JULY']  = AVG(sales) [ANY, ANY,
                                                  time!='JULY'] )
      ORDER BY time, region, product
```

When executed, query Q11 generates a relation in which two calculated members representing "JUNE" and "JULY" rows along the "time" dimension are added for each combination of the values in the "region" and "product" dimension columns. The generated relation is listed in Table 4, where the newly added rows are shown in bold:

TABLE 4

Relation generated by executing query Q11

| REGION | PRODUCT | TIME | SALES |
|--------|---------|-------|-------|
| LA | B | APRIL | 2 |
| SF | A | APRIL | 1 |
| SF | C | APRIL | 3 |
| LA | B | JULY | 3.75 |
| SF | A | JULY | 3.75 |
| SF | C | JULY | 3.75 |
| SF | D | JULY | 3.75 |
| LA | B | JUNE | 5 |
| SF | A | JUNE | 5 |
| SF | C | JUNE | 5 |
| SF | D | JUNE | 5 |
| SF | D | MAY | 4 |

The following query Q12 is executed against the "sales_facts" table:

```
Q12.  SELECT        region, product, time, sales
      FROM          sales_facts
      MODEL         DIMENSION BY   (region r, product p, time t)
                    MEASURE BY     (sales s)
      RULES UPSERT
         ( s[r != 'SF', p != 'D', FOR t IN ('JULY', 'JUNE')] =
                        AVG(s) [ANY, ANY, t NOT IN ('JULY', 'JUNE')] )
      ORDER BY time, region, product
```

When executed, query Q12 generates a relation in which two calculated members representing "JUNE" and "JULY" rows along the "time" dimension are added for each combination of the values in the "region" and "product" dimension columns, where the values in the "region" column are different than "SF" and the values in the "product" column are different than "D". The generated relation is listed in Table 5, where the newly added rows are shown in bold:

TABLE 5

Relation generated by executing query Q12

| REGION | PRODUCT | TIME | SALES |
|--------|---------|-------|-------|
| LA | B | APRIL | 2 |
| SF | A | APRIL | 1 |
| SF | C | APRIL | 3 |
| LA | B | JUNE | 2.5 |
| LA | B | JULY | 2.5 |
| SF | D | MAY | 4 |

In order to obtain the relation shown in Table 5, the rows of the "sales_facts" table are scanned to determine all rows that satisfy the existential predicates "r !='SF'" and "p !='D'". The distinct value combinations in the "region" and "product" columns for the rows that satisfy these predicates are then retrieved. As evidenced by Table 3, the only row in the "sales_facts" table that satisfies these two predicates is the row with values ("LA", "B", "APRIL", "2") in the columns "region", "product", "time" and "sales", respectively. Thus, the only distinct value combination over the "region" and "product" columns is the ("LA", "B") value combination. The two calculated members representing the rows with values "JUNE" and "JULY" in the "time" dimension column are then inserted in the resulting relation based on this value combination. In one embodiment, the for-loop "FOR t IN ('JULY', 'JUNE')" in the left-side expression of the rule may be evaluated at run-time to generate the dimension values "JULY" and "JUNE".

V. Hardware Overview

Figure 3:
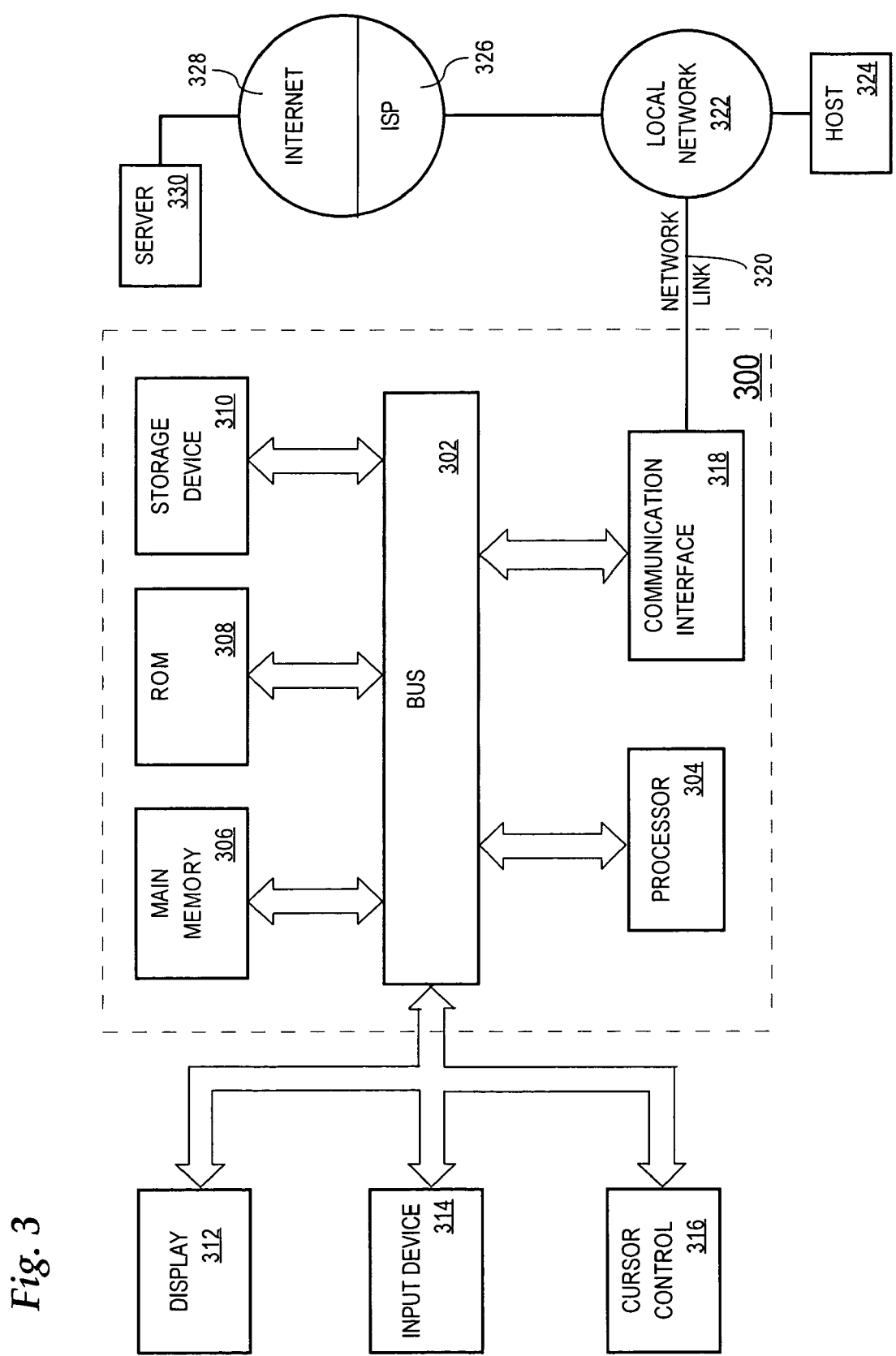
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing queries, comprising the computer-implemented steps of:
   a database server receiving a query that evaluates to a relation, wherein said query comprises:
   a first one or more clauses; and
   a model clause, wherein said model clause comprises:
   a rule that comprises a left-side expression and a right-side expression, wherein said right-side expression includes a window function; and one or more dimension columns that correspond to columns of said relation, wherein said left-side expression references a set of said one or more dimension columns;
wherein said window function specifies a set of columns over which said window function is to be evaluated, wherein said set of columns corresponds to columns of said relation;
said database server executing said query to generate said relation, wherein said database server executing said query comprises:
identifying a column vector, wherein said column vector includes only:
said set of columns that is specified by said window function, and
said set of said one or more dimension columns that is referenced by said left-side expression; and
evaluating said window function based on those columns that are included in said column vector;
wherein the steps of the method are performed by one or more computer systems.

2. The method of claim 1, wherein:
said query is a Structured Query Language (SQL) query; and
said right-side expression includes a plurality of window functions, wherein said window function is one of said plurality of window functions.

3. The method of claim 1, wherein:
said left-side expression of said rule identifies one or more cells in a set of rows, wherein said set of rows is included in said relation;
said window function specifies one or more partition columns by which to partition said set of rows into partitions; and
said step of said database server executing said query comprises:
based on said left-side expression, determining said set of rows in said relation;
based on said one or more partition columns, partitioning said set of rows into one or more subsets of rows; and
evaluating said window function over at least one of said one or more subsets of rows.

4. The method of claim 3, wherein:
each of said one or more cells in said set of rows holds a value that is determined by said right-side expression of said rule; and
said step of said database server executing said query further comprises:
for each cell of said one or more cells, computing the value of said right-side expression of said rule based on information generated during said step of evaluating said window function.

5. The method of claim 1, wherein:
said step of evaluating said window function further comprises:
generating a row source for said window function, wherein said row source identifies one or more cells corresponding to those columns that are included in said column vector;
computing the value of said window function for each of said one or more cells; and
storing the computed value for each of said one or more cells in a corresponding column of said row source; and
said step of said database server executing said query further comprises:

updating said relation based on the values that are stored in said row source.

6. The method of claim 1, wherein:
said window function specifies one or more partition columns by which to partition a set of rows in said relation into partitions, wherein said set of rows includes one or more cells that are identified by said left-side expression of said rule;
said step of said database server executing said query further comprises:
based on said left-side expression, determining said set of rows in said relation; and
based on said one or more partition columns, partitioning said set of rows into one or more subsets of rows; and
said step of evaluating said window function further comprises evaluating said window function over at least one of said one or more subsets of rows.

7. The method of claim 1, wherein:
said rule is a first rule, said left-side expression is a first left-side expression, said right-side expression is a first right-side expression, and said window function is a first window function;
said model clause further comprises a second rule, wherein said second rule comprises a second left-side expression and a second right-side expression, wherein said second right-side expression includes a second window function;
said first window function specifies first one or more partition columns by which to partition a first set of rows in said relation into partitions, wherein said first set of rows includes first one or more cells that are identified by said first left-side expression of said first rule;
said second window function specifies second one or more partition columns by which to partition a second set of rows into partitions, wherein said second set of rows includes second one or more cells that are identified by said second left-side expression of said second rule; and
said step of said database server executing said query comprises:
based on said first left-side expression, determining said first set of rows in said relation;
based on said first one or more partition columns, partitioning said first set of rows into first one or more subsets of rows;
based on said second left-side expression, determining said second set of rows in said relation;
based on said second one or more partition columns, partitioning said second set of rows into second one or more subsets of rows;
evaluating said first window function over at least one of said first one or more subsets of rows; and
evaluating said second window function over at least one of said second one or more subsets of rows.

8. The method of claim 7, wherein said first one or more partition columns are the same as said second one or more partition columns.

9. A non-transitory computer-readable storage medium storing one or more sequences of instructions which, when executed by one or more processors, cause the one or more processors to perform steps comprising:
receiving, at a database server, a query that evaluates to a relation, wherein said query comprises:
a first one or more clauses; and
a model clause, wherein said model clause comprises:

a rule that comprises a left-side expression and a right-side expression, wherein said right-side expression includes a window function; and
one or more dimension columns that correspond to columns of said relation, wherein said left-side expression references a set of said one or more dimension columns;
wherein said window function specifies a set of columns over which said window function is to be evaluated, wherein said set of columns corresponds to columns of said relation;
executing said query at said database server to generate said relation, wherein executing said query comprises:
identifying a column vector, wherein said column vector includes only:
said set of columns that is specified by said window function, and
said set of said one or more dimension columns that is referenced by said left-side expression; and
evaluating said window function based on those columns that are included in said column vector.

10. The non-transitory computer-readable storage medium of claim 9, wherein:
said query is a Structured Query Language (SQL) query; and
said right-side expression includes a plurality of window functions, wherein said window function is one of said plurality of window functions.

11. The non-transitory computer-readable storage medium of claim 9, wherein:
said left-side expression of said rule identifies one or more cells in a set of rows, wherein said set of rows is included in said relation;
said window function specifies one or more partition columns by which to partition said set of rows into partitions; and
the instructions that cause said step of executing said query comprise instructions which, when executed by the one or more processors, cause the one or more processors to perform:
based on said left-side expression, determining said set of rows in said relation;
based on said one or more partition columns, partitioning said set of rows into one or more subsets of rows; and
evaluating said window function over at least one of said one or more subsets of rows.

12. The non-transitory computer-readable storage medium of claim 11, wherein:
each of said one or more cells in said set of rows holds a value that is determined by said right-side expression of said rule; and
the instructions that cause said step of executing said query further comprise instructions which, when executed by the one or more processors, cause the one or more processors to perform:
for each cell of said one or more cells, computing the value of said right-side expression of said rule based on information generated during said step of evaluating said window function.

13. The non-transitory computer-readable storage medium of claim 9, wherein:
the instructions that cause said step of evaluating said window function further comprise instructions which, when executed by the one or more processors, cause the one or more processors to perform:
generating a row source for said window function, wherein said row source identifies one or more cells corresponding to those columns that are included in said column vector;
computing the value of said window function for each of said one or more cells; and
storing the computed value for each of said one or more cells in a corresponding column of said row source; and
the instructions that cause said step of executing said query further comprise instructions which, when executed by the one or more processors, cause the one or more processors to perform:
updating said relation based on the values that are stored in said row source.

14. The non-transitory computer-readable storage medium of claim 9, wherein:
said window function specifies one or more partition columns by which to partition a set of rows in said relation into partitions, wherein said set of rows includes one or more cells that are identified by said left-side expression of said rule;
the instructions that cause said step of executing said query further comprise instructions which, when executed by the one or more processors, cause the one or more processors to perform:
based on said left-side expression, determining said set of rows in said relation; and
based on said one or more partition columns, partitioning said set of rows into one or more subsets of rows; and
the instructions that cause said step of evaluating said window function further comprise instructions which, when executed by the one or more processors, cause the one or more processors to perform evaluating said window function over at least one of said one or more subsets of rows.

15. The non-transitory computer-readable storage medium of claim 9, wherein:
said rule is a first rule, said left-side expression is a first left-side expression, said right-side expression is a first right-side expression, and said window function is a first window function;
said model clause further comprises a second rule, wherein said second rule comprises a second left-side expression and a second right-side expression, wherein said second right-side expression includes a second window function;
said first window function specifies first one or more partition columns by which to partition a first set of rows in said relation into partitions, wherein said first set of rows includes first one or more cells that are identified by said first left-side expression of said first rule;
said second window function specifies second one or more partition columns by which to partition a second set of rows into partitions, wherein said second set of rows includes second one or more cells that are identified by said second left-side expression of said second rule; and
the instructions that cause said step of executing said query further comprise instructions which, when executed by the one or more processors, cause the one or more processors to perform:
based on said first left-side expression, determining said first set of rows in said relation;
based on said first one or more partition columns, partitioning said first set of rows into first one or more subsets of rows;

based on said second left-side expression, determining said second set of rows in said relation;
based on said second one or more partition columns, partitioning said second set of rows into second one or more subsets of rows;
evaluating said first window function over at least one of said first one or more subsets of rows; and
evaluating said second window function over at least one of said second one or more subsets of rows.

16. The non-transitory computer-readable storage medium of claim 15, wherein said first one or more partition columns are the same as said second one or more partition columns.

17. A method for processing queries, comprising the computer-implemented steps of:
a database server receiving a query that evaluates to a relation, wherein said query comprises:
a first one or more clauses; and
a model clause, wherein said model clause comprises:
a rule that comprises a left-side expression and a right-side expression, wherein said right-side expression includes a window function; and
one or more dimension columns that correspond to columns of said relation, wherein said left-side expression references a set of said one or more dimension columns;
wherein said window function specifies a set of columns over which said window function is to be evaluated, wherein said set of columns corresponds to columns of said relation;
said database server executing said query to generate said relation, wherein said database server executing said query comprises:
producing a first set of rows, wherein each row in said first set of rows includes only:
said set of columns that is specified by said window function, and
said set of said one or more dimension columns that is referenced by said left-side expression;
evaluating said window function based on said first set of rows;
wherein the steps of the method are performed by one or more computer systems.

18. The method of claim 17, wherein:
said query is a Structured Query Language (SQL) query; and
said right-side expression includes a plurality of window functions, wherein said window function is one of said plurality of window functions.

19. The method of claim 17, wherein:
said left-side expression of said rule identifies one or more cells in a second set of rows, wherein said second set of rows is included in said relation;
said window function specifies one or more partition columns by which to partition said second set of rows into partitions; and
said step of said database server executing said query comprises:
based on said left-side expression, determining said second set of rows in said relation; and
based on said one or more partition columns, partitioning said second set of rows into one or more subsets of rows;
said step of producing said first set of rows comprises producing said first set of rows based on at least one of said one or more subsets of rows.

20. The method of claim 19, wherein:
each of said one or more cells in said second set of rows holds a value that is determined by said right-side expression of said rule; and
said step of said database server executing said query further comprises:
for each cell of said one or more cells, computing the value of said right-side expression of said rule based on information generated during said step of evaluating said window function.

21. The method of claim 17, wherein:
said step of producing said first set of rows comprises generating a row source for said window function, wherein said row source identifies one or more cells corresponding to those columns that are included in said first set of rows;
said step of evaluating said window function further comprises:
computing the value of said window function for each of said one or more cells; and
storing the computed value for each of said one or more cells in a corresponding column of said row source; and
said step of said database server executing said query further comprises: updating said relation based on the values that are stored in said row source.

22. The method of claim 17, wherein:
said window function specifies one or more partition columns by which to partition a second set of rows in said relation into partitions, wherein said second set of rows includes one or more cells that are identified by said left-side expression of said rule;
said step of said database server executing said query further comprises:
based on said left-side expression, determining said second set of rows in said relation; and
based on said one or more partition columns, partitioning said second set of rows into one or more subsets of rows;
said step of producing said first set of rows comprises producing said first set of rows based on at least one of said one or more subsets of rows.

23. The method of claim 17, wherein:
said rule is a first rule, said left-side expression is a first left-side expression, said right-side expression is a first right-side expression, and said window function is a first window function;
said model clause further comprises a second rule, wherein said second rule comprises a second left-side expression and a second right-side expression, wherein said second right-side expression includes a second window function;
said first window function specifies first one or more partition columns by which to partition a second set of rows in said relation into partitions, wherein said second set of rows includes first one or more cells that are identified by said first left-side expression of said first rule;
said second window function specifies second one or more partition columns by which to partition a third set of rows into partitions, wherein said third set of rows includes second one or more cells that are identified by said second left-side expression of said second rule; and
said step of said database server executing said query comprises:
based on said first left-side expression, determining said second set of rows in said relation;

based on said first one or more partition columns, partitioning said second set of rows into first one or more subsets of rows;
based on said second left-side expression, determining said third set of rows in said relation;
based on said second one or more partition columns, partitioning said third set of rows into second one or more subsets of rows;
said step of producing said first set of rows comprises producing said first set of rows based on at least one of said first one or more subsets of rows;
producing a fourth set of rows based on at least one of said second one or more subsets of rows; and
evaluating said second window function based on said fourth set of rows.

24. The method of claim 23, wherein said first one or more partition columns are the same as said second one or more partition columns.

25. A non-transitory computer-readable storage medium storing one or more sequences of instructions which, when executed by one or more processors, cause the one or more processors to perform steps comprising:
receiving, at a database server, a query that evaluates to a relation, wherein said query comprises:
a first one or more clauses; and
a model clause, wherein said model clause comprises:
a rule that comprises a left-side expression and a right-side expression, wherein said right-side expression includes a window function; and
one or more dimension columns that correspond to columns of said relation, wherein said left-side expression references a set of said one or more dimension columns;
wherein said window function specifies a set of columns over which said window function is to be evaluated, wherein said set of columns corresponds to columns of said relation;
executing said query at said database server to generate said relation, wherein executing said query comprises:
producing a first set of rows, wherein each row in said first set of rows includes only:
said set of columns that is specified by said window function, and
said set of said one or more dimension columns that is referenced by said left-side expression;
evaluating said window function based on said first set of rows.

26. The non-transitory computer-readable storage medium of claim 25, wherein:
said query is a Structured Query Language (SQL) query; and
said right-side expression includes a plurality of window functions, wherein said window function is one of said plurality of window functions.

27. The non-transitory computer-readable storage medium of claim 25, wherein:
said left-side expression of said rule identifies one or more cells in a second set of rows, wherein said second set of rows is included in said relation;
said window function specifies one or more partition columns by which to partition said second set of rows into partitions;
the instructions that cause said step of executing said query comprise instructions which, when executed by the one or more processors, cause the one or more processors to perform:
based on said left-side expression, determining said second set of rows in said relation; and
based on said one or more partition columns, partitioning said second set of rows into one or more subsets of rows;
the instructions that cause said step of producing said first set of rows comprise instructions which, when executed by the one or more processors, cause the one or more processors to perform producing said first set of rows based on at least one of said one or more subsets of rows.

28. The non-transitory computer-readable storage medium of claim 27, wherein:
each of said one or more cells in said second set of rows holds a value that is determined by said right-side expression of said rule; and
the instructions that cause said step of executing said query further comprise instructions which, when executed by the one or more processors, cause the one or more processors to perform:
for each cell of said one or more cells, computing the value of said right-side expression of said rule based on information generated during said step of evaluating said window function.

29. The non-transitory computer-readable storage medium of claim 25, wherein:
the instructions that cause said step of producing said first set of rows comprise instructions which, when executed by the one or more processors, cause the one or more processors to perform generating a row source for said window function, wherein said row source identifies one or more cells corresponding to those columns that are included in said first set of rows;
the instructions that cause said step of evaluating said window function further comprise instructions which, when executed by the one or more processors, cause the one or more processors to perform:
computing the value of said window function for each of said one or more cells; and
storing the computed value for each of said one or more cells in a corresponding column of said row source;
the instructions that cause said step of executing said query further comprise instructions which, when executed by the one or more processors, cause the one or more processors to perform: updating said relation based on the values that are stored in said row source.

30. The non-transitory computer-readable storage medium of claim 25, wherein:
said window function specifies one or more partition columns by which to partition a second set of rows in said relation into partitions, wherein said second set of rows includes one or more cells that are identified by said left-side expression of said rule;
the instructions that cause said step of executing said query further comprise instructions which, when executed by the one or more processors, cause the one or more processors to perform:
based on said left-side expression, determining said second set of rows in said relation; and
based on said one or more partition columns, partitioning said second set of rows into one or more subsets of rows;
the instructions that cause said step of producing said first set of rows further comprise instructions which, when executed by the one or more processors, cause the one or more processors to perform producing said first set of rows based on at least one of said one or more subsets of rows.

31. The non-transitory computer-readable storage medium of claim 25, wherein:
- said rule is a first rule, said left-side expression is a first left-side expression, said right-side expression is a first right-side expression, and said window function is a first window function;
- said model clause further comprises a second rule, wherein said second rule comprises a second left-side expression and a second right-side expression, wherein said second right-side expression includes a second window function;
- said first window function specifies first one or more partition columns by which to partition a second set of rows in said relation into partitions, wherein said second set of rows includes first one or more cells that are identified by said first left-side expression of said first rule;
- said second window function specifies second one or more partition columns by which to partition a third set of rows into partitions, wherein said third set of rows includes second one or more cells that are identified by said second left-side expression of said second rule; and
- the instructions that cause said step of executing said query further comprise instructions which, when executed by the one or more processors, cause the one or more processors to perform:
  - based on said first left-side expression, determining said second set of rows in said relation;
  - based on said first one or more partition columns, partitioning said second set of rows into first one or more subsets of rows;
  - based on said second left-side expression, determining said third set of rows in said relation;
  - based on said second one or more partition columns, partitioning said third set of rows into second one or more subsets of rows;
  - producing said first set of rows based on at least one of said first one or more subsets of rows;
  - producing a fourth set of rows based on at least one of said second one or more subsets of rows; and
  - evaluating said second window function based on said fourth set of rows.

32. The non-transitory computer-readable storage medium of claim 31, wherein said first one or more partition columns are the same as said second one or more partition columns.

* * * * *

UNITED STATES PATENT AND TRADEMARK OFFICE
CERTIFICATE OF CORRECTION

PATENT NO. : 7,979,384 B2  
APPLICATION NO. : 12/113889  
DATED : July 12, 2011  
INVENTOR(S) : Bozkaya et al.

Page 1 of 1

It is certified that error appears in the above-identified patent and that said Letters Patent is hereby corrected as shown below:

On page 2 in column 1, under "Other Publications", line 1, delete "1Og" and insert -- 10g --, therefor.

On page 2, in column 2, under "Other Publications", line 5, delete "1Og" and insert -- 10g --, therefor.

In column 7, line 51, delete "elipses" and insert -- ellipsis --, therefor.

In column 13, line 63, delete "deptno,hiredate" and insert -- deptno, hiredate --, therefor.

In column 15, line 53, delete "interations" and insert -- iterations --, therefor.

Signed and Sealed this  
Fifteenth Day of November, 2011

David J. Kappos  
*Director of the United States Patent and Trademark Office*